(12) United States Patent
Morra et al.

(10) Patent No.: US 12,493,635 B2
(45) Date of Patent: Dec. 9, 2025

(54) TRAINING CONTENT LABELING MODELS

(71) Applicant: ZEFR, Inc., Los Angeles, CA (US)

(72) Inventors: Jonathan Morra, El Segundo, CA (US); Zachary McPherson, La Crescenta, CA (US); Ryan de Marigny, Fresno, CA (US)

(73) Assignee: ZEFR, Inc., Los Angles, CA (US)

( * ) Notice: Subject to any disclaimer, the term of this patent is extended or adjusted under 35 U.S.C. 154(b) by 0 days.

(21) Appl. No.: 18/975,424

(22) Filed: Dec. 10, 2024

(65) Prior Publication Data

US 2025/0190452 A1   Jun. 12, 2025

Related U.S. Application Data

(60) Provisional application No. 63/608,477, filed on Dec. 11, 2023.

(51) Int. Cl.
*G06F 16/00* (2019.01)
*G06F 16/248* (2019.01)
*G06F 16/28* (2019.01)

(52) U.S. Cl.
CPC .......... *G06F 16/285* (2019.01); *G06F 16/248* (2019.01)

(58) Field of Classification Search
CPC ...... G06F 16/245; G06F 16/248; G06F 16/13; G06F 16/3329; G06F 16/24; G06F 16/33; G06F 40/205; G06F 16/906; G06F 16/31; G06F 17/18; G06F 3/048; G06F 16/21; G06F 18/241; G06F 18/213; G06F 16/45; G06F 16/55; G06F 16/75; G06F 40/30; G06F 16/00; G06F 18/2132; G06F 16/213; G06F 16/254; G06F 16/256; G06F 16/258; G06F 16/285; G06F 16/40; G06F 16/433; G06F 16/435; G06F 16/90332; G06F 16/9535; G06F 18/00; G06F 18/23213; G06F 18/2433; G06F 21/6245; G06F 40/103; G06F 40/16; G06F 40/216; G06F 40/279; G06F 40/40; G06N 20/00;

(Continued)

(56) References Cited

U.S. PATENT DOCUMENTS

| | | | |
|---|---|---|---|
| 2021/0406601 A1* | 12/2021 | Narlikar | G06F 18/213 |
| 2024/0296352 A1* | 9/2024 | Yanosy, Jr. | G06N 5/02 |
| 2025/0062003 A1* | 2/2025 | Alkhatib | G16H 20/60 |

* cited by examiner

*Primary Examiner* — Shyue Jiunn Hwa
(74) *Attorney, Agent, or Firm* — Scott D. Thorpe

(57) ABSTRACT

For generating policy labels, a method generates at least one characteristic question that represents an interest policy. The method identifies characteristic question examples from a searchable database, wherein at least one characteristic question example represents each answer to each characteristic question. The method generates first policy labels for each characteristic question of the characteristic question examples. The method generates a content set of search results from the searchable database for search terms generated from each characteristic question. The method generates characteristic labels for the content set using a classifier Multimodal Large Language Model (MLLM) and a confidence criteria. The method generates second policy labels from the characteristic labels for the content set. The method trains a classifier model based on the content set and the second policy labels. The method generates a given policy label for media content using the classifier model.

17 Claims, 14 Drawing Sheets

(58) Field of Classification Search
CPC .......... G06N 3/045; G06N 3/09; G06N 3/044; G06N 3/04; G06N 3/08; G06N 3/008
See application file for complete search history.

| Characteristic Question 103 | Answer 301 | Probability 303 | Label Confidence 305 |

| Characteristic Question 103a | TRUE Answer 301 |
| Characteristic Question 103b | FALSE Answer 301 |
| Characteristic Question 103c | FALSE Answer 301 |
| ⋮ | |
| Characteristic Question 103n | TRUE Answer 301 |

TRAINING CONTENT LABELING MODELS

CROSS-REFERENCE TO RELATED APPLICATIONS

This application claims priority to U.S. Provisional Patent Application No. 63/608,477 entitled "TRAINING CONTENT LABELING LARGE LANGUAGE MODELS" and filed on Dec. 11, 2023 for Jonathan Morra, which is incorporated herein by reference.

BACKGROUND INFORMATION

Efficient Multimodal Large Language Models (MLLM) are difficult to train.

BRIEF DESCRIPTION

A method for generating policy labels is disclosed. The method generates at least one characteristic question that represents an interest policy, wherein each characteristic question is directed to a specific modality and has either TRUE or FALSE answer. The method identifies characteristic question examples from a searchable database, wherein at least one characteristic question example represents each answer to each characteristic question. The method generates first policy labels for each characteristic question of the characteristic question examples. The method then tunes the characteristic question to match the interest policy. The method generates a content set of search results from the searchable database for search terms generated from each characteristic question. The method generates characteristic labels for the content set using a classifier MLLM and a confidence criteria. The method generates second policy labels from the characteristic labels for the content set. The method trains a classifier model based on the content set and the second policy labels. In addition, the method generates a given policy label for media content using the classifier model. An apparatus and computer program product for performing the method are also disclosed.

BRIEF DESCRIPTION OF DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
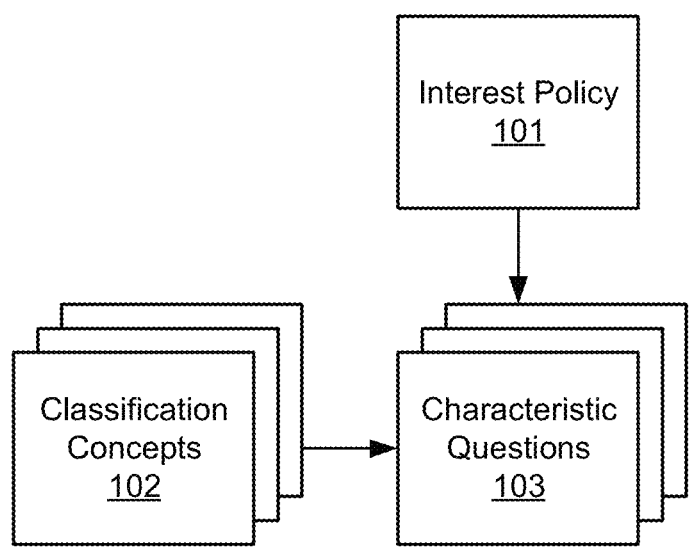
FIG. 1A is a schematic block diagram illustrating one embodiment of an interest policy and characteristic questions.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

Program code for carrying out operations for aspects of the present invention may be written in any combination of one or more programming languages, including an object-oriented programming language such as MATLAB, Python, Ruby, R, Java, Java Script, *Julia*, Smalltalk, C++, C sharp, Lisp, Clojure, Go, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1A is a schematic block diagram illustrating one embodiment of an interest policy 101 and characteristic questions 103. Classification concepts 102 are also shown. The interest policy 101, characteristic questions 103, and classification concepts 102 may be organized as a data structure in a memory.

The interest policy 101 may include an interest policy statement. The interest policy statement may describe objectives of the interest policy 101. The interest policy 101 may be human understandable. The interest policy 101 may define characteristic questions 103 that are used to select media content that is of interest to users. In addition, the interest policy 101 may define characteristic questions 103 that are used to prevent the presentation of media content that is not of interest to and/or not suitable for users. For example, an interest policy 101 may identify sensitive social issues and the interest policy 101 may be employed to stop presentation of media content with the sensitive social issues.

The classification concepts 102 may be selected from the group consisting of sensitive social issues, pets, education, homes, investment, entertainment, travel, automotive, children, drugs, crime, sexual content, profanity, and the like. The classification concepts 102 may be selected to assure characteristic questions 103 cover all aspects of the interest policy 101.

The interest policy 101 is defined by at least one characteristic question 103 that represents the interest policy 101. Each characteristic question 103 is directed to a specific modality and has either a TRUE or a FALSE answer. In one embodiment, characteristic questions 103 are generated to cover related classification concepts 102. In a certain embodiment, characteristic questions 103 are generated to cover all classification concepts 102. The characteristic questions 103 are combined to fully represent the interest policy 101. In one embodiment, the characteristic questions 103 are combined using Boolean logic to represent the interest policy 101.

The characteristic questions 103 may be generated using an expert, a survey of a plurality of users, a generative artificial intelligence (AI) model, combination logic, or combinations thereof. Table 1 lists exemplary characteristic questions 103 for classification concepts of the interest policy 101 "sensitive social issues." The classification questions 103 of table 1 are illustrative for the concept pets.

TABLE 1

| Identifier | Question |
| --- | --- |
| Real-world-pet | Is this text about a real world pet? |
| Is-fictional-animal | Is the social media post about a fictional animal? |
| Is-pet-aggression-or-violence | Does the social media post contain themes or discussion around aggression, violence, or abuse? |
| Is-about-pet-ownership | Is the social media post about pet ownership? |
| Is-video-game | Is the social media post about a video game? |
| Is-pet-compilation | Is the social media post a compilation of pet content? |

Figure 1B:
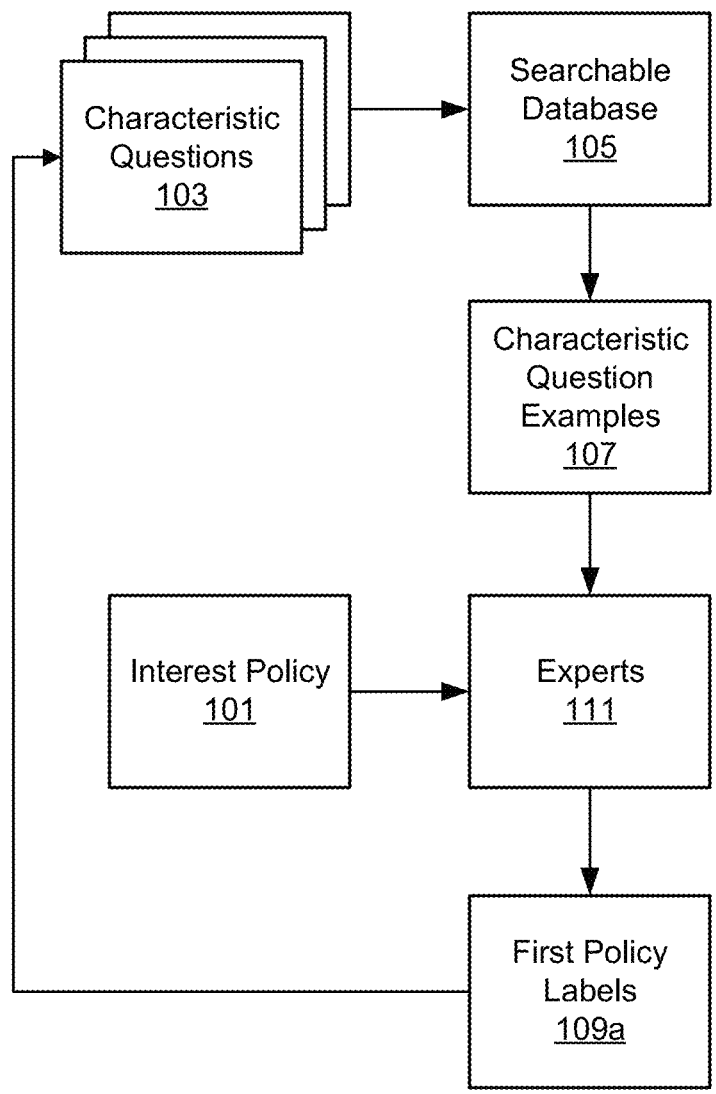
FIG. 1B is a schematic block diagram illustrating one embodiment of first policy label generation.

FIG. 1B is a schematic block diagram illustrating one embodiment of first policy label 109a generation. In the depicted embodiment, the characteristic questions 103 are used to determine first policy labels 109a. The characteristic questions 103 are employed as search inputs to the searchable database 105. The searchable database 105 may be organized as a data structure in a memory. The searchable database 105 may include social media posts, transcripts, internet websites, images, audio, and/or video. The searchable database 105 may include entries in target languages, target modalities, target content lengths, and/or target presence/absence ratios. The searchable database 105 may be of social media. In addition, the searchable database 105 may include a broad spectrum of information. The searchable database 105 may be organized as a relational database management system (RDBMS) or a vector database.

Using each characteristic question 103 as a search input, at least one characteristic question example 107 is identified for each characteristic question from the searchable database 105. Characteristic question examples 107 represent each answer to each characteristic question 103. For example, a first characteristic question example 107 may represent a TRUE answer and a second characteristic question example 107 may represent a FALSE answer. In one embodiment, 10-100 characteristic question examples 107 are identified for each answer to each characteristic question 103. In a certain embodiment, 5-5000 characteristic question examples 107 are identified for each answer to each characteristic question 103.

At least one expert 111 may be presented with the interest policy 101 and the characteristic question examples 107. Each expert 111 may be a human expert. In addition, experts 111 may be an AI model. The experts 111 answer the characteristic question examples 107 in order to satisfy the interest policy 101. The characteristic question examples 107 and corresponding example answers are combined to generate first policy labels 109a. Examples of policy labels 109 are shown in FIG. 3D. In one embodiment, the characteristic questions 103 are combined using logical operators such as AND, OR, and NOT to form a policy label 109. In one embodiment, the first policy labels 109a are used to tune the characteristic questions 103 as will be described hereafter.

Figure 1C:
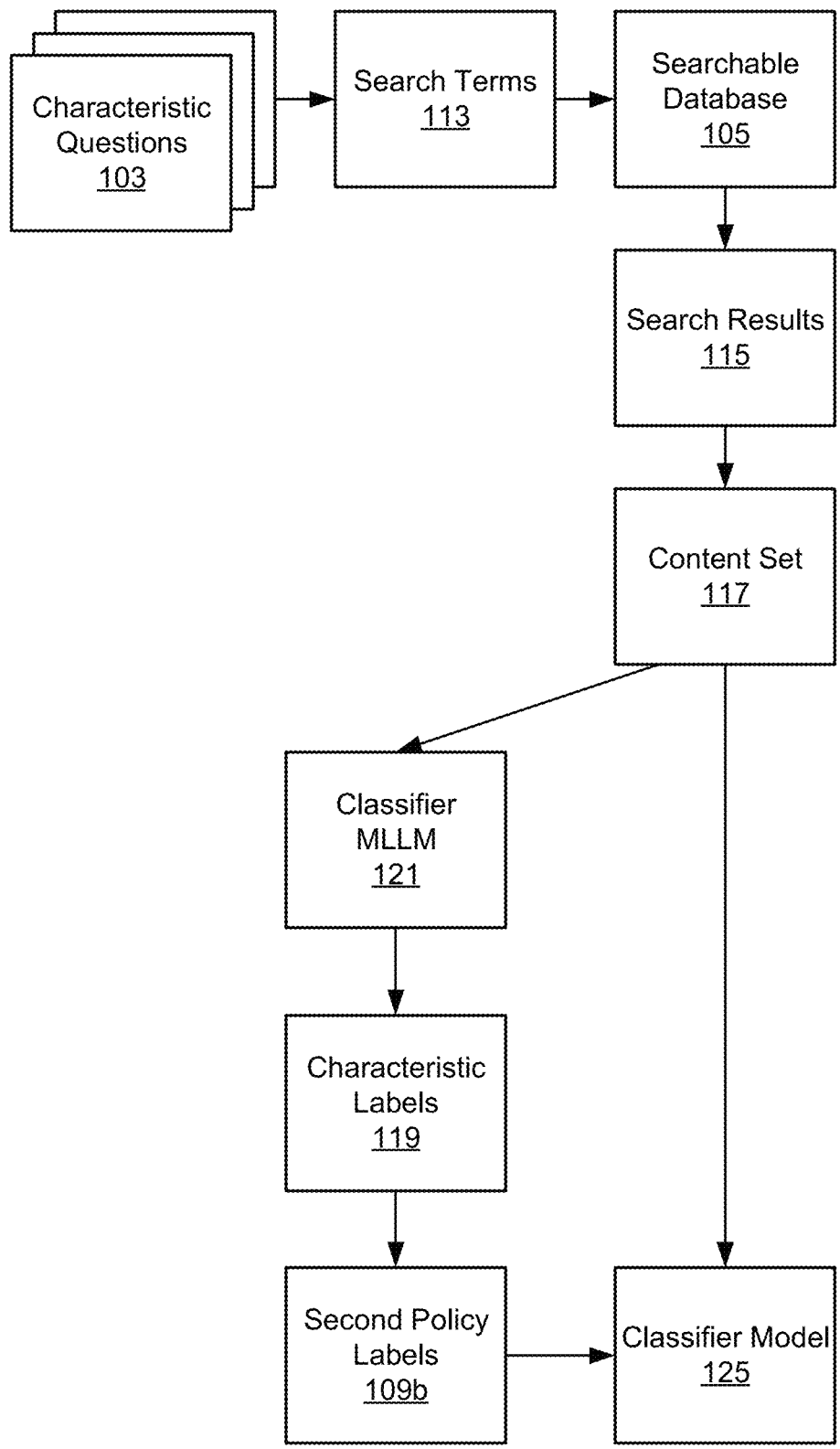
FIG. 1C is a schematic block diagram illustrating one embodiment of classifier model training.

FIG. 1C is a schematic block diagram illustrating one embodiment of classifier model 125 training. The characteristic questions 103 are used to generate a content set 117 and second policy labels 109b that are used to train the classifier model 125.

In the depicted embodiment, the characteristic questions 103 are used to generate the content set 117 from search results 115 of the searchable database 105. The searchable database 105 may not be identical to the searchable database 105 of FIG. 1B. The searchable database 105 may be of social media. The searchable database 105 may be organized as a relational database management system (RDBMS), a vector database, or any other storage mechanism for finding related content. Alternatively, the searchable databases 105 of FIGS. 1B and 1C may be the same.

In one embodiment, search terms 113 are generated from the characteristic questions 103. The search terms 113 may be generated by a generative AI model and/or an expert 111. The search terms 113 may be used as inputs to the searchable database 105 to generate the search results 115. The search terms 113 may be designed to exercise all aspects of the characteristic questions 103. In addition, search results 115 may be generated to exercise all aspects of the characteristic questions 103.

The content set 117 may include target languages, target modalities, target content lengths, and/or target presence/absence ratios. Table 2 includes illustrative targets. As used herein, a presence/absence ratio is the number of content units containing given content divided by the number of content units not containing the given content. Content units may be a specified length of text, a specified length of audio or video, a number of images, and the like.

TABLE 2

| Target Category | Targets |
| --- | --- |
| Languages | English, Spanish, French |
| Target modalities | Image, video, audio, text |
| Target content lengths | 20-120 words |
|  | 121-500 words |
|  | 501-5000 words |
|  | 10-300 seconds video |
|  | 301-1000 seconds video |
|  | 60-300 seconds audio |
|  | 301-1000 seconds audio |
| Presence/absence ratios | 10:1 to 1:1 |

In one embodiment, a classifier MLLM 121 generates characteristic labels 119 from the content set 117. The characteristic labels 119 may be generated as a token. The classifier MLLM 121 may output one token as the binary answer to a characteristic question 103 as the characteristic label 119. The characteristic label 119 may comprise the corresponding characteristic question 103, the binary answer, and the probability as shown hereafter in FIG. 3A.

The probability of a given answer of the one token may be compared with the probability of the inverse binary answer for the one token. The difference between the binary answer probability and the inverse binary answer probability is a label confidence for the characteristic label 119. The greater the label confidence, the greater the confidence of the classifier MLLM 121 in the characteristic label 119.

In one embodiment, a characteristic question 103 is modified based on the label confidence to ensure that the classifier MLLM 121 understands the characteristic question 103. For example, the characteristic question 103 may be modified until the classifier MLLM 121 generates characteristic labels 119 with label confidence greater than a confidence criteria.

Second policy labels 109b are generated from the characteristic labels 119 for the content set 117. In one embodiment, only characteristic labels 119 with a label confidence greater than a characteristic threshold are used to generate the second policy labels 109b. As a result, the second policy labels 109b are statically defined, Boolean combinations of the characteristic labels 119.

The classifier model 125 is trained based on the content set 117 and the corresponding second policy labels 109b. For example, content from the content set 117 and the corresponding second policy label 109b are presented as training data as will be described hereafter to train the classifier model 125.

The classifier model 125 is used to generate policy labels 109 for media content. For example, media content may be presented to the classifier model 125 and the classifier model generates a corresponding policy label 109.

Figure 1D:
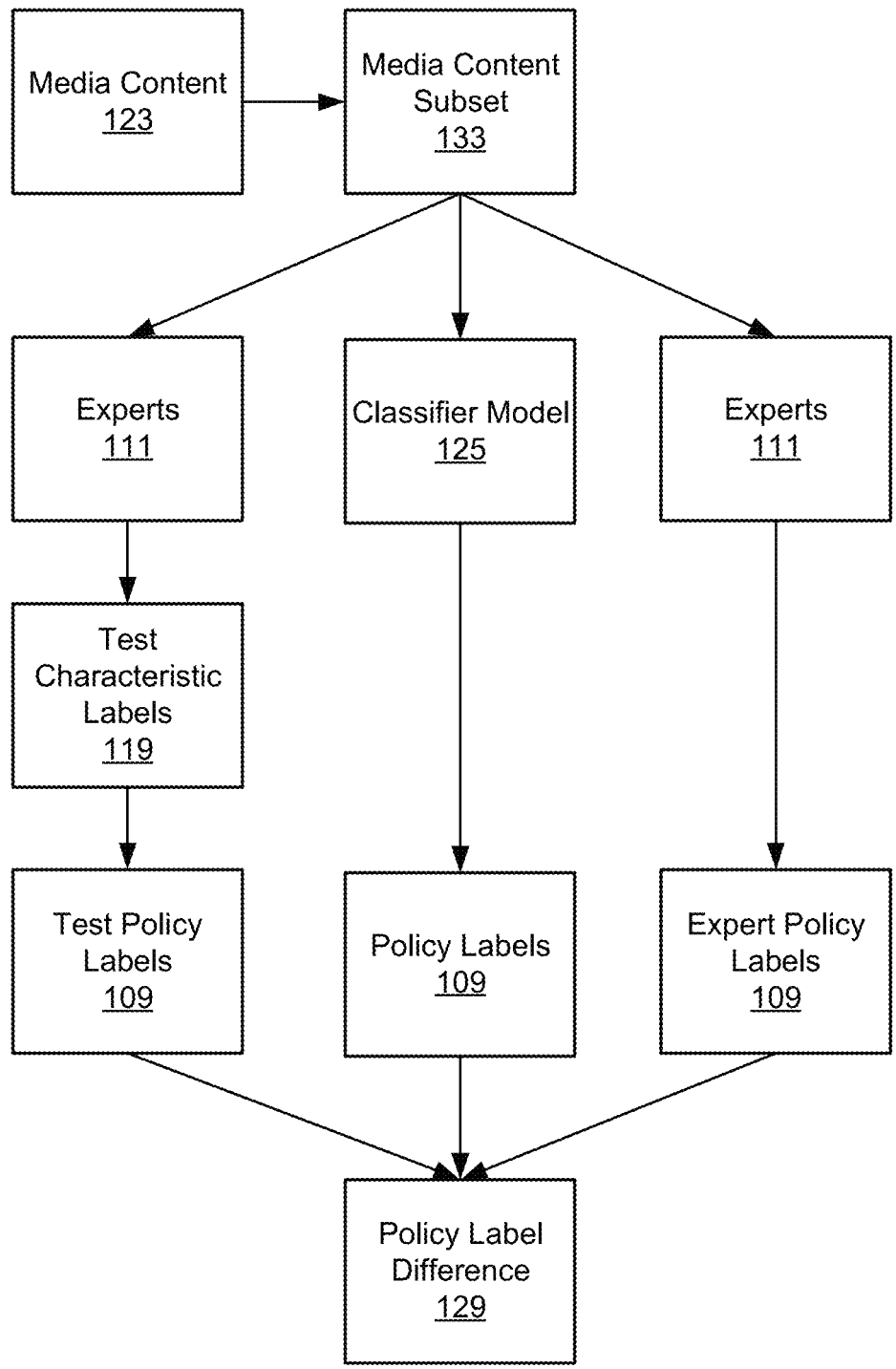
FIG. 1D is a schematic block diagram illustrating one embodiment of classifier model testing.

FIG. 1D is a schematic block diagram illustrating one embodiment of classifier model testing. The classifier model 125 is tested to determine whether the policy labels 109 generated by the classifier model 125 accurately reflect the interest policy 101. In the depicted embodiment, a media content subset 133 is selected from media content 123. The classifier model 125 generates policy labels 109 for each element of the media content subset 133.

In addition, the experts 111 generate test characteristic labels 119 for the media content subset 133. Test policy labels 109 are further generated from the test characteristic labels 119. The test policy labels 109 are the ground truth for whether elements of the media content subset 133 satisfy the interest policy 101. The test policy labels 109 are compared to the policy labels 109 to generate a policy label difference 129.

In one embodiment, experts 111 generate expert policy labels 109 for the media content subset 133. The expert policy labels 109 may be compared to the policy labels 109 and/or test policy labels 109 to generate the policy label difference 129.

In one embodiment, the policy label difference 129 is generated in real time to check the performance of the classifier model 125. The test policy labels 109 are also compared to the expert policy labels 109 to determine and show model quality of the classifier model 125.

Figure 2:
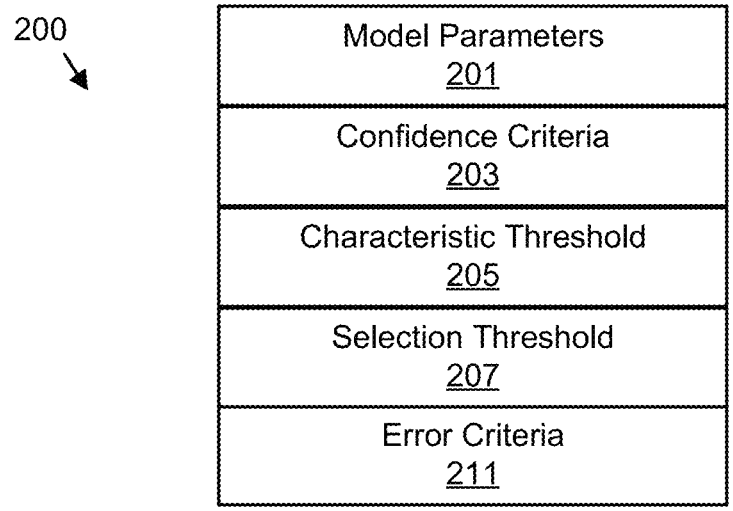
FIG. 2 is a schematic block diagram illustrating one embodiment of training parameters.

FIG. 2 is a schematic block diagram illustrating one embodiment of training parameters 200. The training parameters 200 may be organized as a data structure in a memory. In the depicted embodiment, the training parameters 200 include model parameters 201, the confidence criteria 203, the characteristic threshold 205, a selection threshold 207, and an error criteria 211.

The selection threshold 207 may be used to select a classifier model 125 from a plurality of classifier models 125. The error criteria 211 may be used to determine when content violates the interest policy 101. Training parameters 200 are used to train the classifier model 125. Table 3 lists exemplary training parameters 200.

TABLE 3

Figure 3A:
FIG. 3A is a schematic block diagram illustrating one embodiment of a characteristic label.

Learning rate
Batch size
Epochs
Sequence length
Early stopping to prevent overfitting
Gradient clipping
Regularization FIG. 3A is a schematic block diagram illustrating one embodiment of a characteristic label 109. Each characteristic label 119 may be organized as a data structure in a memory. In the depicted embodiment, the characteristic label 119 includes the characteristic question 103, the answer 301, the probability 103, and the label confidence 305.

The probability 303 may be a logarithmic probability, a linear probability, or the like. In one embodiment, the label confidence is a top k tokens generated by the classifier MLLM 121 in a logarithmic probability distribution. For binary answers 301, k may be 2. The k logarithmic probabilities are converted to linear probabilities. The linear probability of the TRUE answer 301 may be the label confidence 305.

In one embodiment, if no tokens with a TRUE answer 301 are generated, FALSE answer tokens are searched for. If no FALSE answer tokens are found, no characteristic label 119 is generated. In a certain embodiment, if a token similar to a negative answer 301 token is generated in the plurality of tokens, the label confidence 305 is zero.

Figure 3B:
FIG. 3B is a schematic block diagram illustrating one embodiment of an interest policy.

FIG. 3B is a schematic block diagram illustrating one embodiment of an interest policy 101. In the depicted embodiment, the interest policy 101 is defined by at least one policy label 109. Each policy label 109 may comprise a characteristic question 103 and a corresponding TRUE or FALSE answer 301. In one embodiment, the interest policy 101 employs the first policy labels 109a.

Figure 3C:
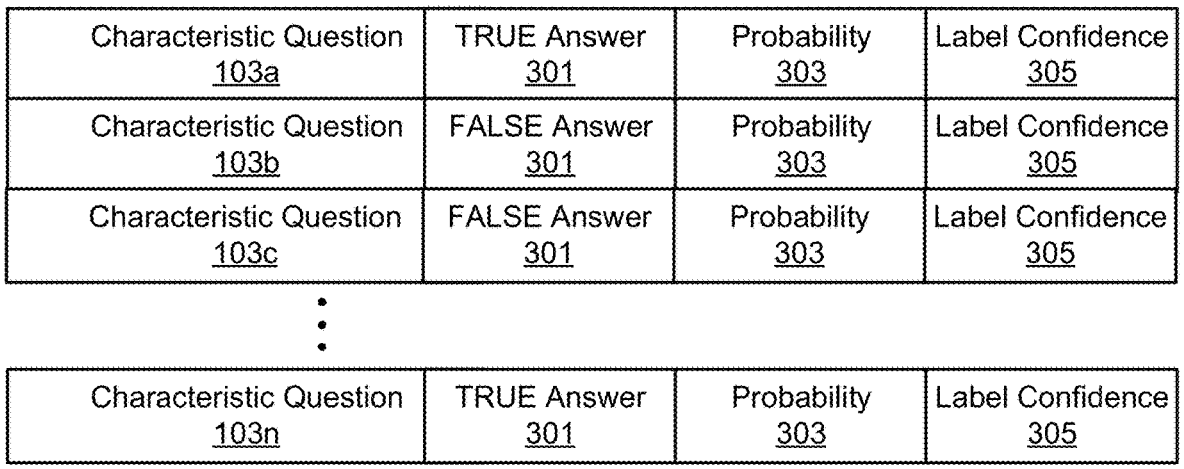
FIG. 3C is a schematic block diagram illustrating one alternate embodiment of characteristic labels.
Figure 3D:
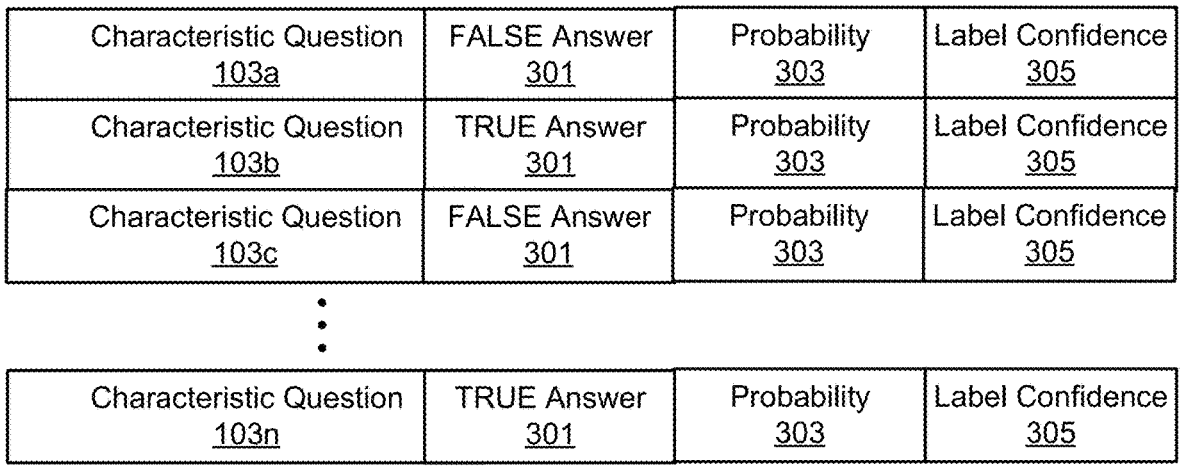
FIG. 3D is a schematic block diagram illustrating one alternate embodiment of characteristic labels.

FIG. 3C is a schematic block diagram illustrating one alternate embodiment of characteristic labels 119. The characteristic labels 119 are generated by the classifier model 125 for an element of content media 123. In the depicted embodiment, the answers 301 for each characteristic question 119 match the answers 301 for each policy label 109 of the interest policy 101 of FIG. 3B. As a result, the characteristic labels 119 satisfy the interest policy 101.

FIG. 3D is a schematic block diagram illustrating one alternate embodiment of characteristic labels 119. The characteristic labels 119 are generated by the classifier model 125 for an element of content media 123. In the depicted embodiment, the answers 301 for two characteristic questions do not match the answers 301 for policy labels 109 of the interest policy 101 of FIG. 3B. If the error criteria 211 only allows one answer 301 to differ from the policy labels 109, the characteristic labels 119 do not satisfy the interest policy 101.

Figure 4A:
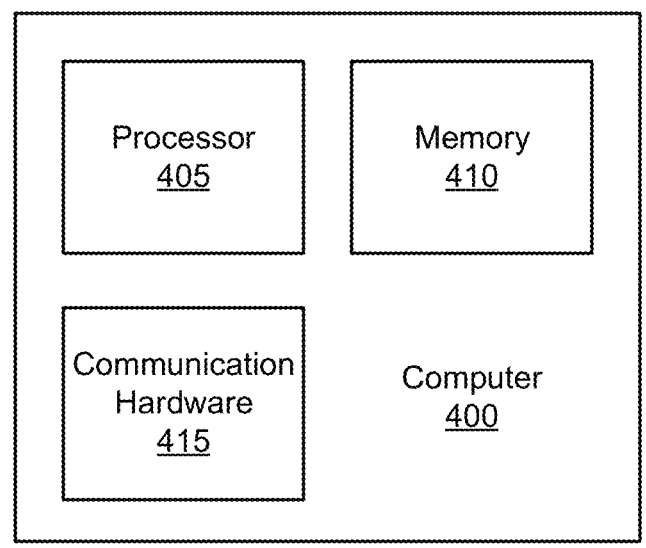
FIG. 4A is a schematic block diagram illustrating one embodiment of a computer.

FIG. 4A is a schematic block diagram illustrating one embodiment of a computer 400. In the depicted embodiment, the computer 400 includes a processor 405, memory 410, and communication hardware 415. The memory 410 may store code and data. The processor 405 may execute the code and process the data. The communication hardware can may communicate with other devices.

Figure 4B:
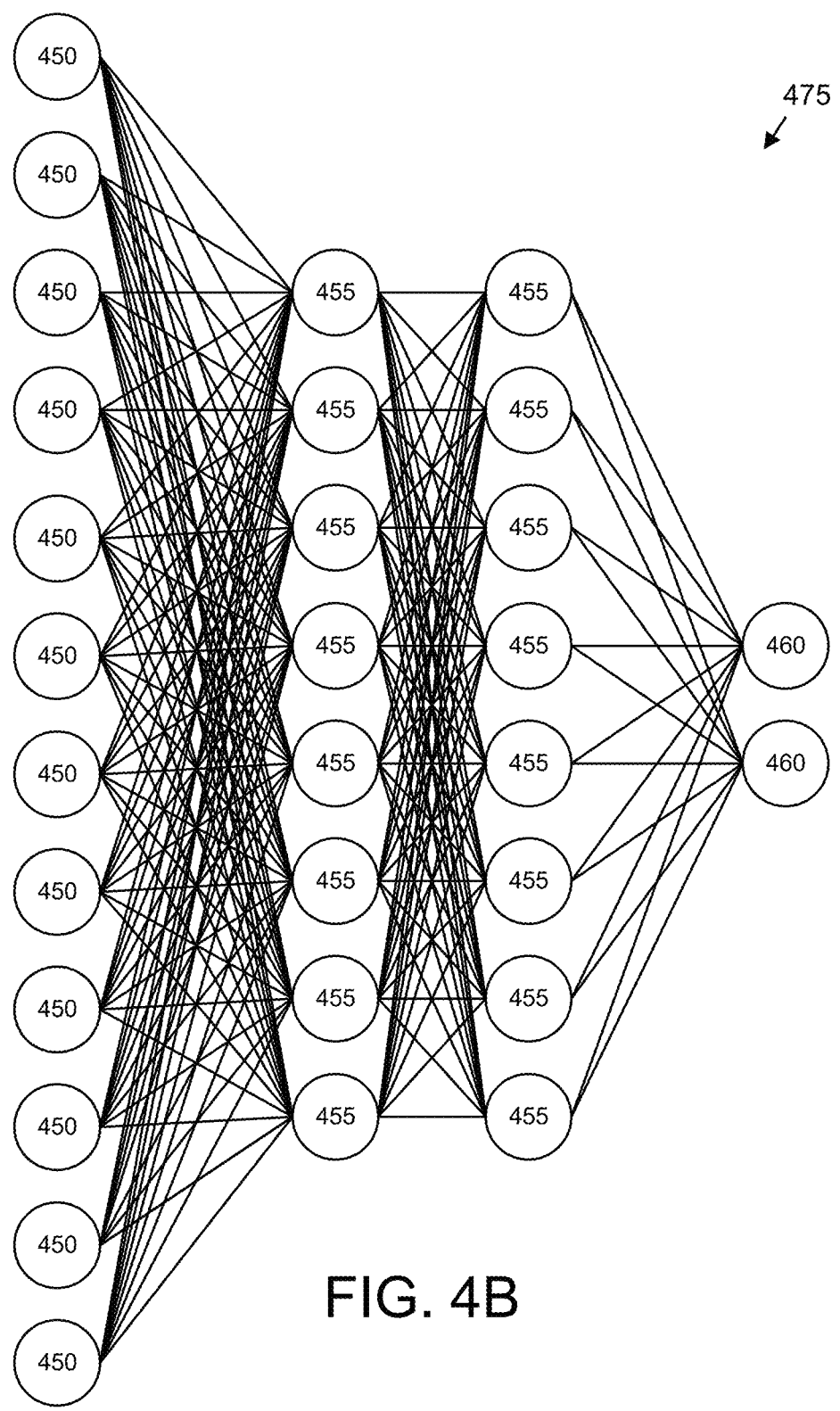
FIG. 4B is a schematic block diagram illustrating one embodiment of neural network.

FIG. 4B is a schematic block diagram illustrating one embodiment of neural network 475. In the depicted embodiment, the neural network 475 includes input neurons 450, hidden neurons 455, and output neurons 460. The neural network 475 may be organized as a convolutional neural network, a recurrent neural network, long short term memory (LSTM) network, a transformer, and the like.

The neural network 475 may be trained with training data. The training data may include the content set 117 and the second policy labels 109b. The neural network 475 may be trained using one or more learning functions while applying the training data to the input neurons 450 and known result values for the output neurons 460, subject to the model parameters 201. Subsequently, the neural network 475 may receive actual data at the input neurons 450 and make predictions at the output neurons 460 based on the actual data. The actual data may include data from the content media 123.

Figure 5A:
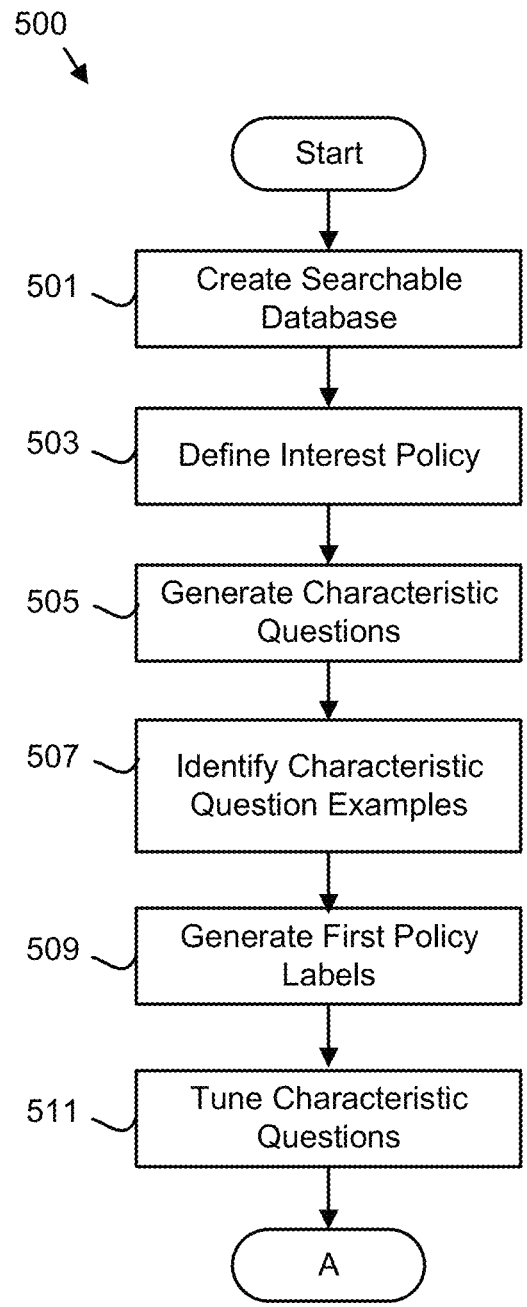
FIGS. 5A-B are schematic flow chart diagrams illustrating one embodiment of a classifier model generation method.
Figure 5B:
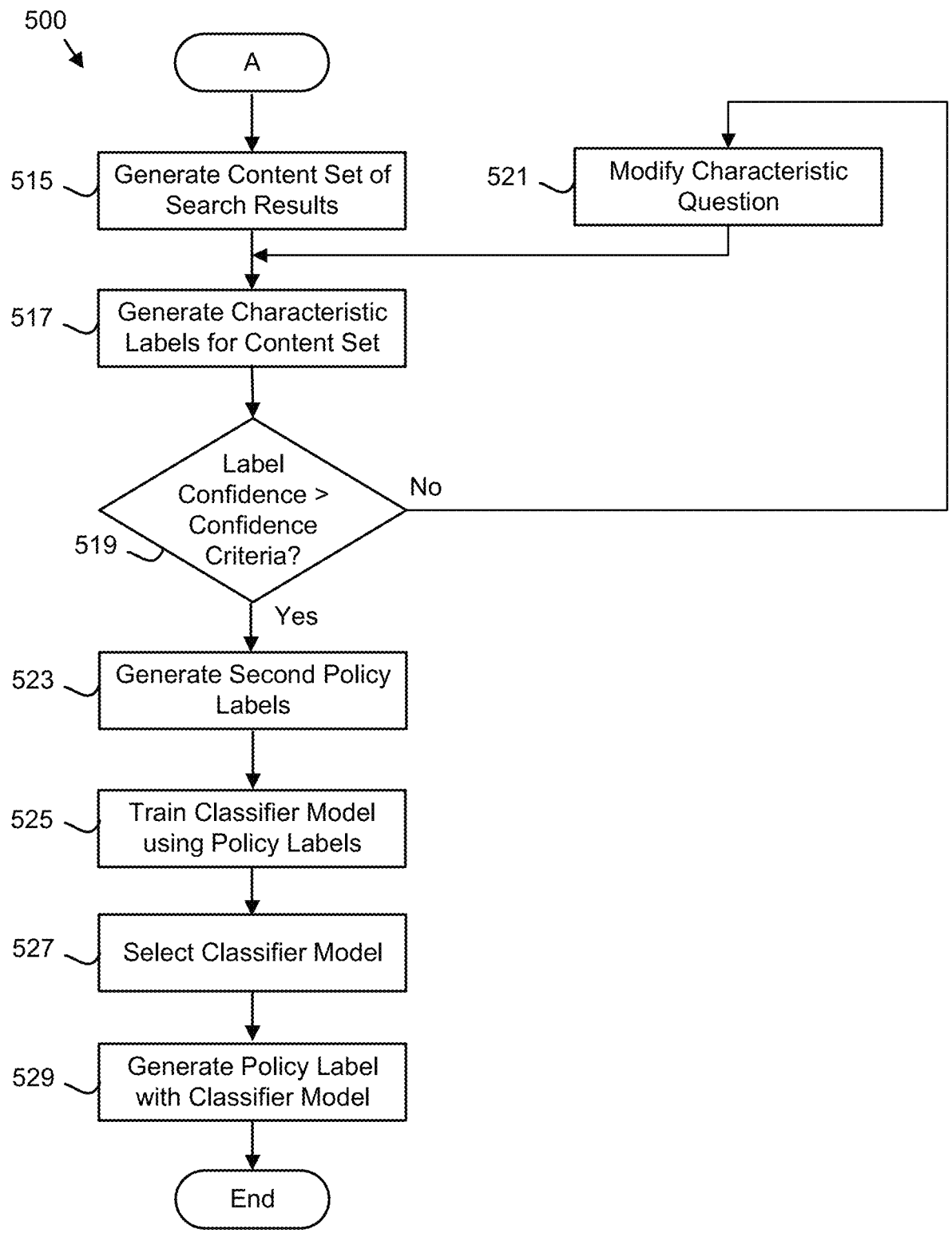

FIGS. 5A-B are schematic flow chart diagrams illustrating one embodiment of a classifier model generation method 500. The method 500 may train the classifier model 125. The method 500 may be performed by the computer 400, the processor 405, and/or the neural network 475.

The method 500 starts and creates 501 the searchable database 105. The searchable database may have a large volume of content. The content may be media content 123. In one embodiment, the media content 123 is social media content.

The method 500 defines 503 the interest policy 101. The interest policy 101 may be human understandable. The interest policy 101 may include an interest policy statement. The interest policy statement may describe objectives of the interest policy 101.

The method 500 generates 505 at least one characteristic question 103 that represents the interest policy 101. Each characteristic question 103 is directed to at least one modality. The classification concepts 102 may specify a plurality of modalities. In addition, each characteristic question 103 has either a TRUE or FALSE answer 301. Sufficient characteristic questions 103 are generated 505 to fully represent the interest policy 101.

The method 500 identifies 507 characteristic question examples 107 from the searchable database 105. At least one characteristic question example 107 represents each answer 301 to each characteristic question 103.

The method 500 generates 509 the first policy labels 109a for each characteristic question 103 using the characteristic question examples 107. In one embodiment, the first policy labels 109a are generated by experts 111 that are conversant with the interest policy 101. In an alternative embodiment, the first policy labels 109a are generated by the generative AI model.

The method 500 may tune 511 the characteristic questions 103. In one embodiment, the characteristic questions 103 are modified to match the interest policy 101. The characteristic questions 103 may be modified by the experts 111, the computer 400, and/or the neural network 475. In addition, each characteristic question 103 may be modified to improve the label confidence 305.

The method 500 generates 515 the content set 117. The content set 117 may be generated 515 from the searchable database 105. The content set 117 may be generated 515 from search results 115 from the searchable database 105 for search terms 113 generated from each characteristic question 103. The search terms 113 may be semantic searches. In addition, the search terms 113 may be keyword searches. In a certain embodiment, the content set 117 may be generated 515 from search results 115 from the searchable database 105 in response to the characteristic questions 103.

The method 500 generates 517 characteristic labels 119 for the content set 117 using the classifier MLLM 121 and the confidence criteria 203. The classifier MLLM 121 may output one token as the binary answer 301 to a characteristic question 103 along with the probability 303. The label confidence 305 may be the linear answer probability 303 of a positive token in the probability distribution.

In one embodiment, if the label confidence 305 less than the confidence criteria 203, the method 500 may modify 521 the characteristic question 103 to generate characteristic labels 119 with greater label confidence 305. As a result, the classifier MLLM 121 generates characteristic labels 119 with high label confidence 305. If the label confidence 305 is not less than the confidence criteria 203, the method 500 generates 523 second policy labels 109b from the characteristic labels 119 for the content set 117. The second policy labels 109 may be generated 523 as shown in FIG. 3B, comprising the characteristic question 103 and answer 301 for each characteristic label 119.

The method 500 trains 525 the classifier model 125 based on the content set 117 and/or the second policy labels 109b. The content set 117 and the second policy labels 109b may be training data for the classifier model 125 subject to the model parameters 201. The classifier model 125 may be trained 525 as described in FIG. 5C.

The method 500 may train 525 a plurality of classifier models 125 and select 527 one classifier model 125 based on the policy label difference 129. In one embodiment, the policy label difference 129 is less than the selection threshold 207. FIG. 5E illustrates one embodiment of selecting 527 a classifier model 125.

The method 500 generates 529 policy labels 109 for content such as the content media 123 using the classifier model 125. FIG. 5D describes generating 529 policy labels 109.

Figure 5C:
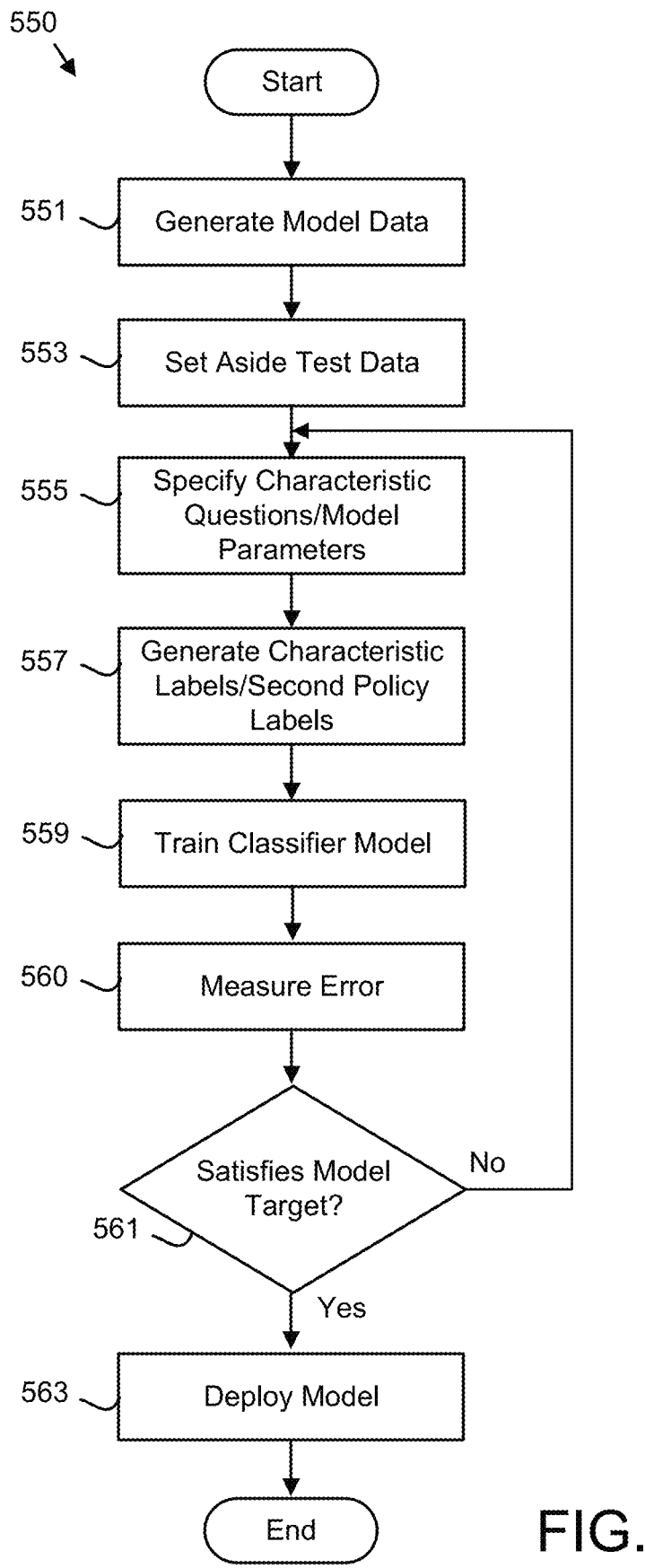
FIG. 5C is a schematic flow chart diagram illustrating one embodiment of a model training method.
Figure 5D:
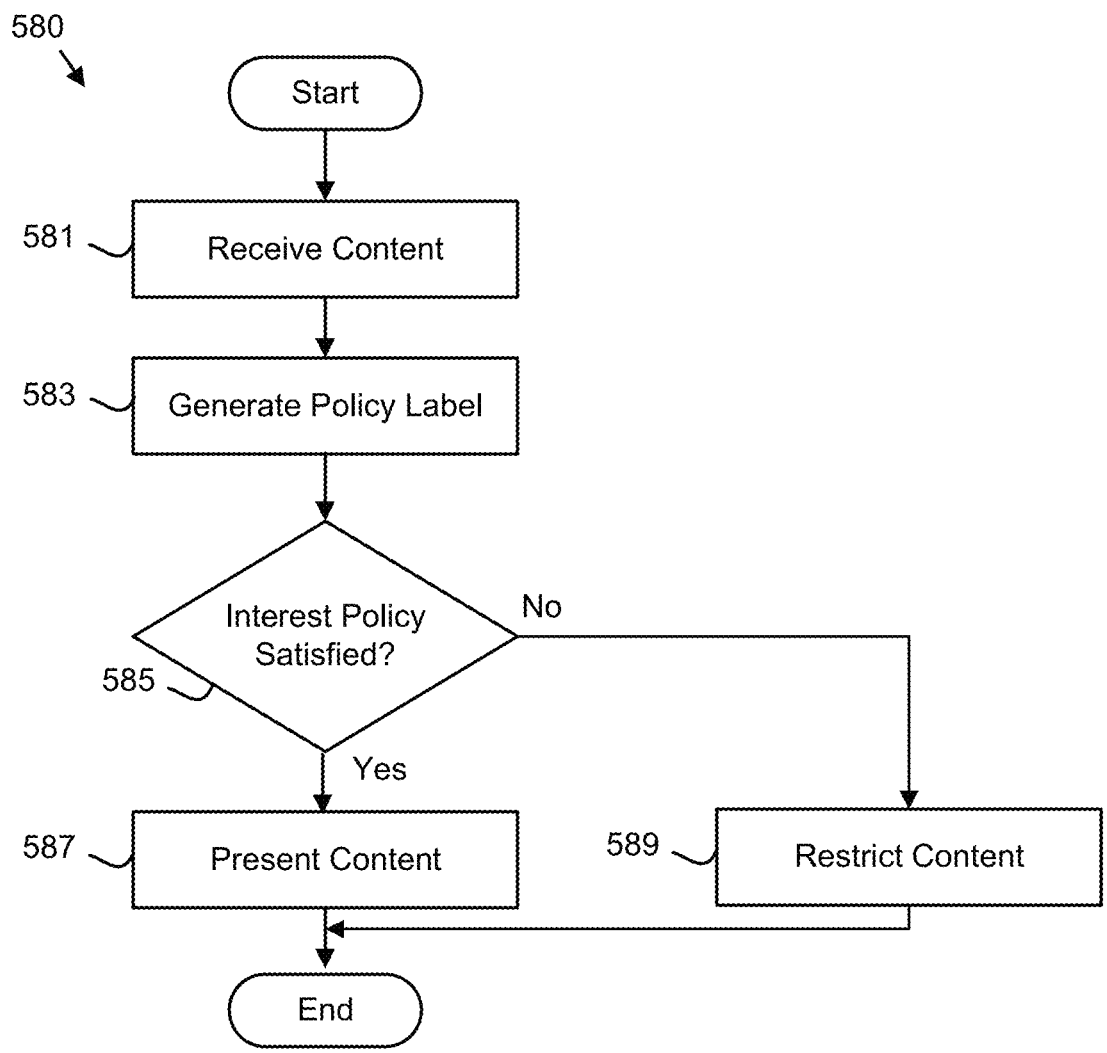
FIG. 5D is a schematic flowchart diagram illustrating one embodiment of a policy label generation method.
Figure 5E:
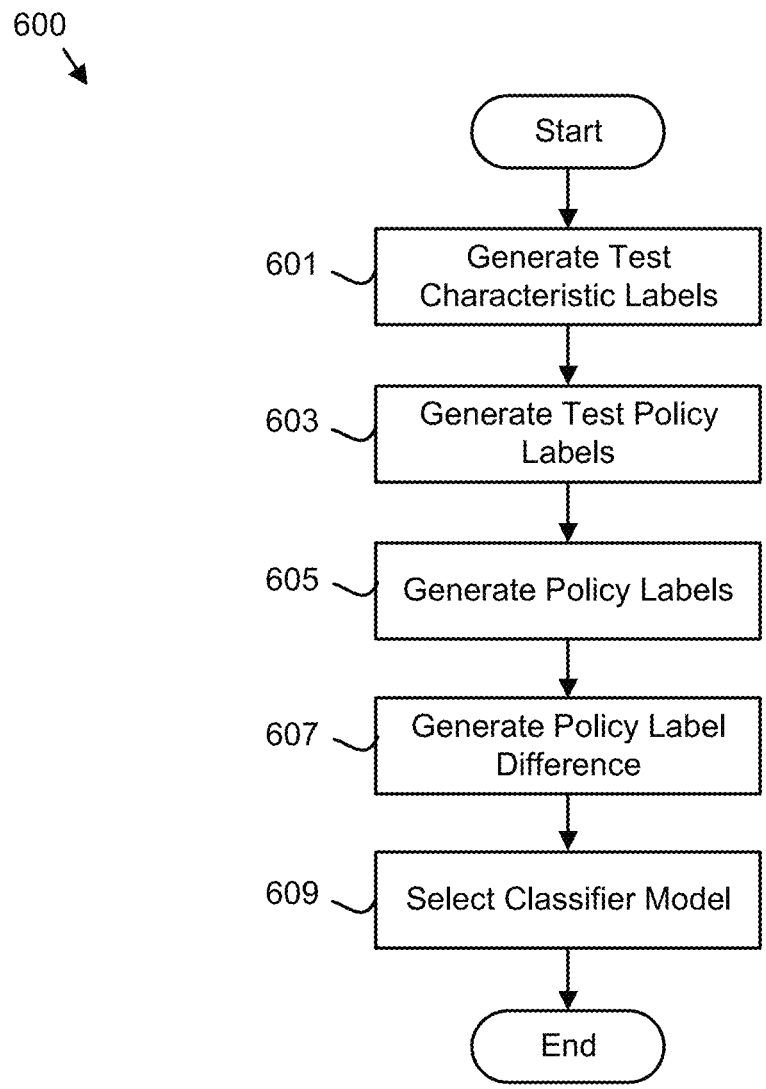
FIG. 5E is a schematic flowchart diagram illustrating one embodiment of a classifier model selection method.

FIG. 5C is a schematic flow chart diagram illustrating one embodiment of a model training method 550. The method 550 may be used to train the classifier MLLM 121 and/or classifier model 125. The method 550 starts and in one embodiment, the method 550 generates 551 model training data. The model training data may include the content set 117 and the second policy labels 109b. Other data may be employed. The model training data may be historic data. In one embodiment, real-time model training data is added.

The method 550 may set aside 553 a portion of the model training data as test data. The test data will not be used to train the model. The test data may be the media content subset 133 as shown in FIG. 1D.

The method 550 may specify 555 the model parameters 201. The model is trained 557 using the model training data in accordance with the model parameters 201.

The method 550 generates 559 a prediction from the model with the test data. The prediction may be a policy label 109. In one embodiment, the method 550 determines 561 whether the prediction satisfies the ground truth as shown in FIG. 1D. If the prediction does not satisfy the target model, the training parameters 275 are modified 555 and the model is again trained 557. If the prediction satisfies the target model, the trained model is deployed 563 and the method 550 ends.

FIG. 5D is a schematic flow chart diagram illustrating one embodiment of a policy label generation method 580. The method 580 generates policy labels 109 for content and presents or restricts the content based on the policy label 109. The method 580 may be performed by the computer 400, the processor 405, and/or the neural network 475.

The method 580 receives 581 content such as an element of media content 123 and generates 583 a policy label 109 for the content using the classifier model 125. In one embodiment, the content is an input to the classifier model 125 and the classifier model 125 outputs the policy label 109.

If the policy label 109 indicates that the content satisfies the interest policy 101, the method 580 presents 587 the content. However, if the policy label 109 indicates that the content does not satisfy the interest policy 101, the method 580 restricts 589 the content. For example, the method 580 may restrict 589 presentation of the content. Alternatively, the method 580 may restrict 589 content by requiring permission before presentation.

FIG. 5E is a schematic flow chart diagram illustrating one embodiment of a classifier model selection method 600. The 600 method selects a classifier model 125. The 600 method may be performed by the computer 400, the processor 405, and/or the neural network 475 and is illustrated in FIG. 1D.

The method 600 generates 601 test characteristic labels 119 for a media content subset 133 of the media content 123 using experts 111. The 600 method generates 603 test policy labels 109 from the test characteristic labels 119. The method 600 generates 605 policy labels 109 for the media content subset 133 using a classifier model 125 such as is described in FIGS. 1C and 5A-B. The method 600 generates 607 a policy label difference 129 between the test policy labels 109 and corresponding policy labels 109. The method 600 may select 609 the classifier model 125 if the policy label difference 129 is less than the selection threshold 207. In addition, the method 600 may select 609 the classifier model 125 with the lowest policy label difference 129 from a plurality of classifier models 125.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method comprising:
    generating at least one characteristic question that represents an interest policy, wherein each characteristic question is directed to at least one modality and has either a TRUE or FALSE answer;
    identifying characteristic question examples from a searchable database, wherein at least one characteristic question example represents each answer to each characteristic question;
    generating first policy labels for each characteristic question of the characteristic question examples, wherein each policy label comprises a characteristic question and a TRUE or FALSE answer;
    tuning the characteristic questions based on the results of the first policy labels to match the interest policy;

generating a content set of search results from the searchable database for search terms generated from each characteristic question;

generating characteristic labels for the content set using a classifier Multimodal Large Language Model (MLLM) and a confidence criteria, wherein each characteristic label comprises a characteristic question, a corresponding TRUE or FALSE answer, a probability of a TRUE answer, and a label confidence;

calculating the label confidence for characteristic label answers for each characteristic question as the probability of the token generated by the classifier MLLM to be equal to the TRUE token;

in response to the label confidence being less than a confidence criteria, modifying the corresponding characteristic question to generate an updated characteristic label with a greater characteristic confidence;

generating second policy labels from the characteristic question and corresponding TRUE or FALSE answer of each characteristic label for the content set;

training a classifier model based on the content set and the second policy labels; and generating a given policy label for media content using the classifier model.

2. The method of claim 1, the method further comprising:
generating test characteristic labels for a media content subset of the media content using experts;
generating test policy labels from the test characteristic labels;
generating a policy label difference between the test policy labels and corresponding policy labels generated from the media content subset.

3. The method of claim 2, wherein the policy label differences are generated in real time.

4. The method of claim 1, where the characteristic question examples comprise at least one characteristic question example for specified languages, modalities, content lengths, or presence/absence ratios.

5. The method of claim 1, the method further creating the searchable database with a large volume of content.

6. The method of claim 1, the method further comprising defining the interest policy for the media content, wherein the interest policy is human understandable.

7. An apparatus comprising:
a processor that executes code to perform:
generating at least one characteristic question that represents an interest policy, wherein each characteristic question is directed to at least one modality and has either a TRUE or FALSE answer;
identifying characteristic question examples from a searchable database, wherein at least one characteristic question example represents each answer to each characteristic question;
generating first policy labels for each characteristic question of the characteristic question examples, wherein each policy label comprises a characteristic question and a TRUE or FALSE answer;
tuning the characteristic questions based on the results of the first policy labels to match the interest policy;
generating a content set of search results from the searchable database for search terms generated from each characteristic question;
generating characteristic labels for the content set using a classifier Multimodal Large Language Model (MLLM) and a confidence criteria, wherein each characteristic label comprises a characteristic question, a corresponding TRUE or FALSE answer, a probability of a TRUE answer, and a label confidence;

calculating the label confidence for characteristic label answers for each characteristic question as the probability of the token generated by the classifier MLLM to be equal to the TRUE token;

in response to the label confidence being less than a confidence criteria, modifying the corresponding characteristic question to generate an updated characteristic label with a greater characteristic confidence;

generating second policy labels from the characteristic question and corresponding TRUE or FALSE answer of each characteristic label for the content set;

training a classifier model based on the content set and the second policy labels; and generating a given policy label for media content using the classifier model.

8. The apparatus of claim 7, the processor further performing:
generating test characteristic labels for a media content subset of the media content using experts;
generating test policy labels from the test characteristic labels;
generating a policy label difference between the test policy labels and corresponding policy labels generated from the media content subset.

9. The apparatus of claim 8, wherein the policy label differences are generated in real time.

10. The apparatus of claim 7, where the characteristic question examples comprise at least one characteristic question example for specified languages, modalities, content lengths, or presence/absence ratios.

11. The apparatus of claim 7, the processor further creating the searchable database with a large volume of content.

12. The apparatus of claim 7, the processor defining the interest policy for the media content, wherein the interest policy is human understandable.

13. A computer program product comprising a non-transitory computer readable storage medium storing code that is executed by a processor to perform:
generating at least one characteristic question that represents an interest policy, wherein each characteristic question is directed to at least one modality and has either a TRUE or FALSE answer;
identifying characteristic question examples from a searchable database, wherein at least one characteristic question example represents each answer to each characteristic question;
generating first policy labels for each characteristic question of the characteristic question examples, wherein each policy label comprises a characteristic question and a TRUE or FALSE answer;
tuning the characteristic questions based on the results of the first policy labels to match the interest policy;
generating a content set of search results from the searchable database for search terms generated from each characteristic question;
generating characteristic labels for the content set using a classifier Multimodal Large Language Model (MLLM) and a confidence criteria, wherein each characteristic label comprises a characteristic question, a corresponding TRUE or FALSE answer, a probability of a TRUE answer, and a label confidence;
calculating the label confidence for characteristic label answers for each characteristic question as the probability of the token generated by the classifier MLLM to be equal to the TRUE token;

in response to the label confidence being less than a confidence criteria, modifying the corresponding characteristic question to generate an updated characteristic label with a greater characteristic confidence;

generating second policy labels from the characteristic question and corresponding TRUE or FALSE answer of each characteristic label for the content set;

training a classifier model based on the content set and the second policy labels; and generating a given policy label for media content using the classifier model.

14. The computer program product of claim 13, the processor further performing:

generating test characteristic labels for a media content subset of the media content using experts;

generating test policy labels from the test characteristic labels;

generating a policy label difference between the test policy labels and corresponding policy labels generated from the media content subset.

15. The computer program product of claim 14, wherein the policy label differences are generated in real time.

16. The computer program product of claim 13, where the characteristic question examples comprise at least one characteristic question example for specified languages, modalities, content lengths, or presence/absence ratios.

17. The computer program product of claim 13, the processor further creating the searchable database with a large volume of content.

* * * * *